US012691643B2

(12) United States Patent
Gurvich

(10) Patent No.: US 12,691,643 B2
(45) Date of Patent: Jul. 28, 2026

(54) JOINTS FOR COMPOSITE LAMINATED PANELS AND BEAMS

(71) Applicant: B/E AEROSPACE, INC., Winston Salem, NC (US)

(72) Inventor: Mark R. Gurvich, Middletown, CT (US)

(73) Assignee: B/E AEROSPACE, INC., Winston Salem, NC (US)

( * ) Notice: Subject to any disclaimer, the term of this patent is extended or adjusted under 35 U.S.C. 154(b) by 184 days.

(21) Appl. No.: 18/471,158

(22) Filed: Sep. 20, 2023

(65) Prior Publication Data

US 2025/0091298 A1     Mar. 20, 2025

(51) Int. Cl.
B29C 65/00           (2006.01)

(52) U.S. Cl.
CPC ...... B29C 66/4344 (2013.01); B29C 66/1312 (2013.01); B29C 66/346 (2013.01); B29C 66/721 (2013.01)

(58) Field of Classification Search
CPC ... B29C 66/1312; B29C 66/346; B29C 66/41; B29C 66/434; B29C 66/4342; B29C 66/43421; B29C 66/4344; B29C 66/43441; B29C 66/4346; B29C 66/43561; B29C 66/438; B29C 66/721; F16B 9/07
USPC .................................. 403/300; 428/119, 120
See application file for complete search history.

(56) References Cited

U.S. PATENT DOCUMENTS

| | | | |
|---|---|---|---|
| 4,671,470 A * | 6/1987 | Jonas .................. | B29C 66/1142 |
| | | | 428/116 |
| 5,948,501 A * | 9/1999 | Obermeyer ......... | B60C 15/0209 |
| | | | 428/98 |

| | | | |
|---|---|---|---|
| 6,505,449 B1 * | 1/2003 | Gregori ............... | E04G 23/0218 |
| | | | 52/514 |
| 7,244,487 B2 * | 7/2007 | Brantley ............... | B29C 65/562 |
| | | | 244/123.7 |
| 7,291,373 B2 * | 11/2007 | Bartley-Cho ............. | F16B 5/01 |
| | | | 428/117 |
| 10,539,174 B2 * | 1/2020 | Gurvich ............... | B29D 23/001 |
| 10,823,213 B2 | 11/2020 | Gurvich et al. | |

(Continued)

FOREIGN PATENT DOCUMENTS

| | | | |
|---|---|---|---|
| DE | 102017206687 | 10/2018 | |
| DE | 102019205356 A1 * | 10/2020 | ........... B29C 65/565 |

(Continued)

OTHER PUBLICATIONS

European Patent Office, European Search Report dated Feb. 20, 2025 in Application No. 24201482.7.

*Primary Examiner* — Joshua E Rodden

(74) *Attorney, Agent, or Firm* — SNELL & WILMER L.L.P.

(57)           ABSTRACT

A joint for use with a composite laminated component is disclosed herein. The joint includes a component including a partial U-shaped trapezoidal cavity and a triangular component. The partial trapezoidal component includes a base extending in a first direction, a first side extending away from the base at a first angle from the first direction, a second side extending away from the base at a second angle from the first direction and toward the first side, and an opening defined by the first side and the second side. The triangular component is coupled to the base and extending orthogonally away from the base in a second direction and toward the opening.

8 Claims, 9 Drawing Sheets

(56)          References Cited

U.S. PATENT DOCUMENTS

| | | | |
|---|---|---|---|
| 10,927,883 B2 * | 2/2021 | Gurvich .............. | B29C 66/1162 |
| 11,041,478 B2 * | 6/2021 | Monie ................... | F03D 1/0675 |
| 11,761,421 B2 * | 9/2023 | Keohan ................. | F03D 1/0675 |
| | | | 416/241 R |
| 2003/0075919 A1 * | 4/2003 | Schulte-Ladbeck ......................... | |
| | | | B29C 66/5221 |
| | | | 285/368 |
| 2005/0064134 A1 | 3/2005 | Brantley et al. | |
| 2005/0186390 A1 * | 8/2005 | Bersuch .................... | C09J 5/06 |
| | | | 156/92 |
| 2011/0008175 A1 * | 1/2011 | Gau ..................... | F03D 1/0675 |
| | | | 416/233 |
| 2017/0058867 A1 * | 3/2017 | Yarbrough ............ | F03D 1/0675 |
| 2021/0245864 A1 * | 8/2021 | Gurvich ................. | F16C 7/026 |

FOREIGN PATENT DOCUMENTS

| | | | | |
|---|---|---|---|---|
| EP | 3953156 B1 * | 4/2020 | ............ | B29C 65/56 |
| EP | 3666504 A1 * | 6/2020 | ............ | F16B 5/0012 |
| WO | 2020207672 | 10/2020 | | |

* cited by examiner

900

Position joint adjacent an edge area of a composite component    902

Apply a load to the joint in the direction of the composite component    904

Couple the joint to another component    906

JOINTS FOR COMPOSITE LAMINATED PANELS AND BEAMS

FIELD

The present disclosure generally relates to composite materials, and more particularly, to joints for laminated composite materials.

BACKGROUND

Fiber-reinforced polymer-matrix composite materials are widely used in aircraft structural applications because of their high-strength reinforcing fibers resulting in high strength to weight ratios. Composite aircraft components are often designed as laminated systems for their fabrication advantages and optimized structural integrity. For example, laminated aircraft composite structures may be used as wall panels, overhead storage panels, supporting beams, stringers, shells, etc. However, composite materials may have challenges in efficient load transfer between two composite components or between composite and metal components.

While joining of metallic aircraft components can be easily implemented by well-established methods such as welding or fasteners (e.g., bolts, rivets), joining of composites is often a challenge. Generally, through-thickness fasteners for laminated composites can generate additional risks of local damage due to relatively week interlaminar and transverse strength properties of laminated composites. Composite welding is applicable only to thermoplastics and still generates polymer/polymer contact without full advantage of high-strength reinforcing fibers. Adhesive-based joints can be a convenient solution, but they also miss advantage of fiber high-strength properties and can be too sensitive to potential degradation and aging. These challenges can be especially important in case of primarily structural composite elements where reliable load transfer is important.

SUMMARY

A joint for use with a composite laminated component is disclosed herein. The join includes a partial trapezoidal component and a triangular component. The partial trapezoidal component includes a base extending in a first direction, a first side extending away from the base at a first angle from a second direction, the second direction being orthogonal to the first direction, a second side extending away from the base at a second angle from the second direction and toward the first side, and an opening defined by the first side and the second side. The triangular component is coupled to the base and extends orthogonally away from the base in the second direction and toward the opening.

In various embodiments, the first side includes a top surface facing away from the base and a side surface facing toward the second side, the side surface forming a corner with the top surface, wherein the corner is rounded. In various embodiments, the first angle the same as the second angle. In various embodiments, the joint further includes a second triangular component coupled to the base and disposed adjacent the triangular component. In various embodiments, the joint further includes a flange extending from the base in the first direction and a hole formed through the flange, the hole configured to receive a fastener to secure the joint to a panel.

In various embodiments, the further includes a lug coupled the base and extending in a third direction. In various embodiments, the lug is monolithic to the base.

Also disclosed herein is a system of interlocked components including a composite component including a first portion, a second portion, and a split between the first portion and the second portion and a joint. The joint includes a partial trapezoidal component that includes a base extending in a first direction, a first side extending away from the base at a first angle from a second direction, the second direction being orthogonal to the first direction, a second side extending away from the base at a second angle from the second direction and toward the first side, and an opening defined by the first side and the second side and configured to receive the composite component, and a triangular component coupled to the base and extending orthogonally away from the base in the second direction and toward the opening, the triangular component configured to insert into the split.

In various embodiments, the first side is disposed adjacent to and physically contacting the first portion and the second side is disposed adjacent to and physically contacting the second portion. In various embodiments, the first side includes a top surface facing away from the base and a side surface facing toward the second side, the side surface forming a corner with the top surface, wherein the corner is rounded.

In various embodiments, the system further includes a panel including a first surface that is coupled to the base. In various embodiments, the panel is coupled to the based using an adhesive. In various embodiments, the base further includes a flange extending from the base in the first direction, the flange being coupled to the panel by a fastener.

In various embodiments, the composite component further includes a first plurality of full-length plies, a second plurality of full-length plies, and a shorter ply disposed between the first plurality of full-length plies and the second plurality of full-length plies and forming the split. In various embodiments, the composite component further includes a third portion and a second split disposed between the second portion and the third portion, wherein the joint further includes a second triangular component coupled to the base and extending orthogonally away from the base in the second direction and toward the opening, the second triangular component configured to insert into the second split.

Also disclosed herein is a method including forming a split in an edge area of a composite component, positioning a joint adjacent the edge area of the composite component, the joint including a triangular component configured to engage the split, and applying a load to the joint in a first direction toward the composite component to seat the joint onto the composite component.

In various embodiments, the method further includes applying a lubrication to the triangular component before applying the load. In various embodiments, forming the split includes stacking a first plurality of full-length plies, stacking a second plurality of full-length plies, and placing a temporary insert between the first plurality of full-length plies and the second plurality of full-length plies.

In various embodiments, the method further includes stacking a shorter ply between the first plurality of full-length plies and the second plurality of full-length plies and placing the temporary insert between the first plurality of full-length plies and the second plurality of full-length plies and adjacent the shorter ply. In various embodiments, the method further includes placing a first sandwich panel adjacent the first plurality of full-length plies and opposite the second plurality of full-length plies and placing a second sandwich panel adjacent the second plurality of full-length plies and opposite the first plurality of full-length plies.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1C:
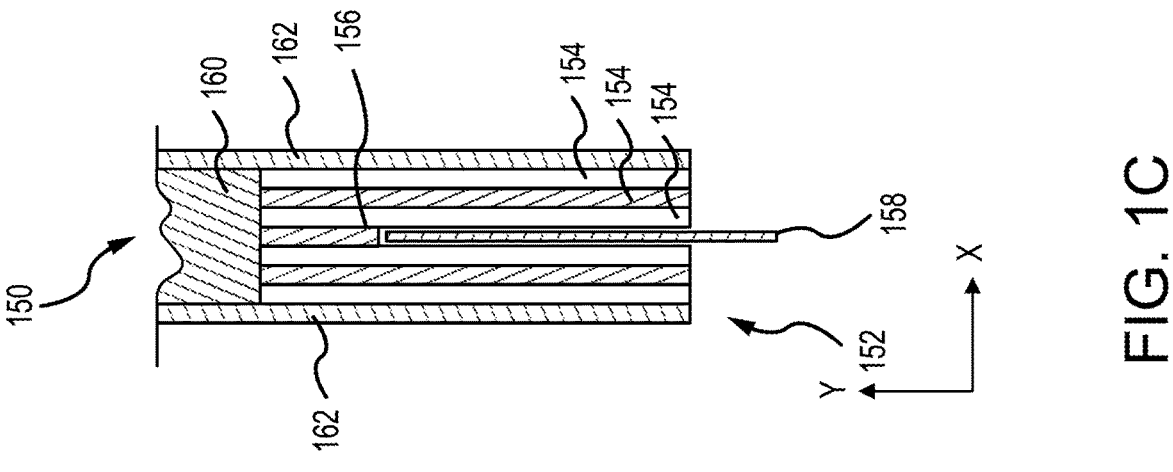
FIGS. 1A, 1B, and 1C illustrate cross-sectional views of an edge area of composite components with a split before installation with a joint, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein joints and joint systems for composite components that utilize the advantages of high-performance fiber-reinforced polymer-matrix laminated composites while minimizing their disadvantages. In various embodiments, the composite components may include a monolithic laminated construction. In various embodiments, the composite components may include sandwiched laminated construction. In various embodiments, the composite component may be a panel or a shell. In various embodiments, the composite component may be a beam. In various embodiments, the joints and joint system described herein may be attached, or coupled, to the composite component without the use of adhesives and/or fasteners.

In various embodiments, the joints and joint systems described herein may be installed on an edge of the composite component to facilitate reliable load transfer between the composite component and the joint. In various embodiments, the joints and joint systems described herein improve the structural integrity of the composite component by resisting axial, torsional, and bending movement of the composite material. In various embodiments, the joints and joint systems described herein may be implemented in aircraft and automotive applications, among others. Furthermore, and in various embodiments, the joints and joint systems described herein may reduce manufacturing costs and/or installation times.

In various embodiments, the joint may include a metallic component having partial U-shaped trapezoidal open-ended cavity that is configured to be attached to the edge of the composite component. In various embodiments, a metallic triangular insert is disposed within the U-shaped cavity, the metallic insert is configured to engage the composite component to secure the joint to the composite component. In various embodiments, an axial split may be formed in the edge of the composite component that is configured to the receive the metallic component. In various embodiments, the joint may be installed by applying an axial compression force to the joint. In various embodiments, the axial compression force may be dynamic (e.g., using a hammer). In various embodiments, the axial compression force may be static (e.g., using a hydraulic press).

In various embodiments, the joints and joint systems described herein enhance the structural performance of the composite component due to the fastener-free and adhesive-free installation of the joint. In various embodiments, the joints and joint systems described herein reduce the installation time by removing or reducing the use of adhesives and fasteners. In various embodiments, the joints and joint systems described herein result in a lighter total weight of the entire joint and composite component systems than similar conventional fastening systems.

Figure 1B:
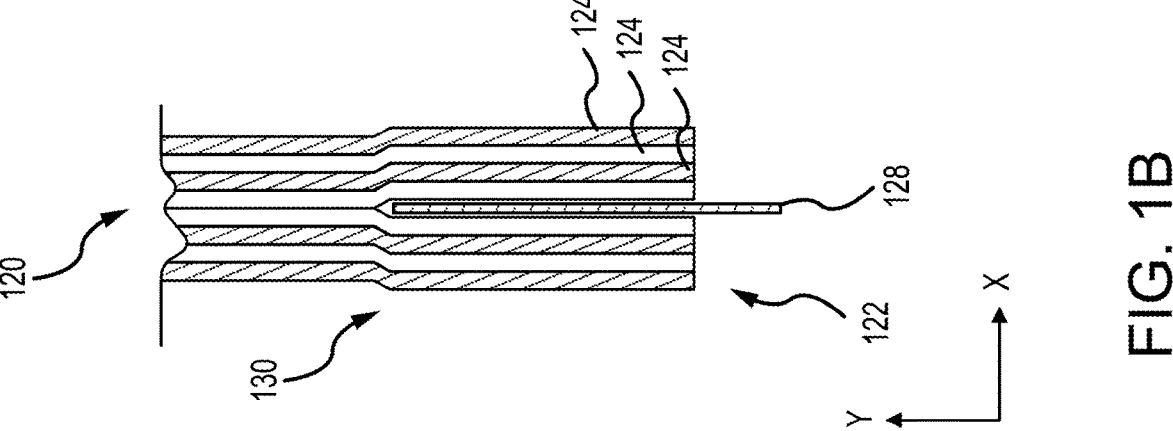
Figure 1A:
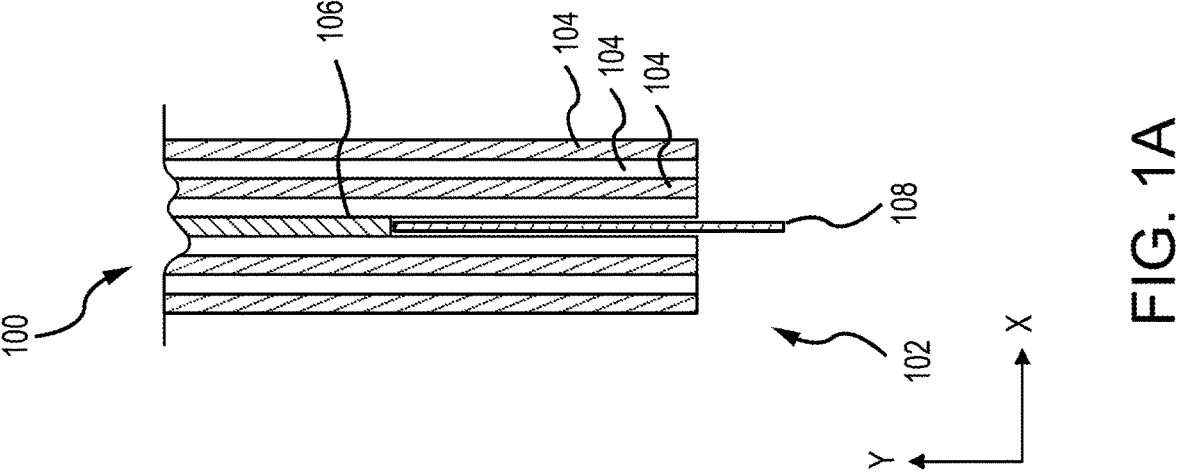

Referring now to FIGS. 1A-1C, cross-sectional views of the fabrication of a split in an edge area of various laminated composite components are illustrated, in accordance with various embodiments. FIG. 1A illustrates the fabrication of an edge area 102 of a composite component 100 including a plurality of individual plies, in accordance with various embodiments. FIG. 1B illustrates the fabrication of an edge area 122 of a composite component 120 including a plurality of individual plies, in accordance with various embodiments. FIG. 1C illustrates the fabrication of an edge area 152 of a composite component 150 including a sandwich panel, in accordance with various embodiments. FIGS. 1A-1C are examples of how to fabricate a split, or groove, in the edge areas of composite component 100, 120, 150. Other fabrication methods are contemplated including destructive methods such as cutting, sawing, and ablating, among others. A number of individual plies may vary and may depend on design priorities and objectives. In various embodiments, composite component 100, 120, 150 may be a composite panel. In various embodiments, composite component 100, 120, 150 may be a part of composite shell or solid composite structure. In various embodiments, composite component 100, 120, 150 may be a composite beam.

FIG. 1A illustrates a cross-sectional view of a split, or groove, being fabricated in edge area 102 (e.g., in the negative y-direction) of composite component 100. Composite component 100, and more specifically edge area 102, includes a plurality of individual full-length plies 104, a short ply (or a plurality of short plies) 106, and an temporary insert ply 108. In various embodiments, the plurality of full-length plies 104 and short ply 106 may include the same material. In various embodiments, the plurality of full-length plies and/or short ply 106 may include different materials. In various embodiments, the plurality of full-length plies 104 may extend an entire length (e.g., along the y-axis) of composite component 100. In various embodiments, short ply 106 may extend as a partial length of the entire length of composite component (e.g., about 10% to about 90%).

Short ply 106 is disposed between the plurality of full-length plies 104 to form the split, or groove, in edge area 102. During fabrication of composite component 100 (e.g., combining the plurality of full-length plies 104 at one side from the split with short ply 106), temporary insert ply 108 may be inserted between the plurality of full-length plies 104 to reserve a temporary space for future split for the plurality of full-length plies 104. In various embodiments, temporary insert ply 108 may include surfaces coated in a material having a negligible adhesion and/or friction surface such as, for example, polytetrafluoroethylene (PTFE) (e.g., Teflon®). In various embodiments, temporary insert ply 108 may be formed of the material having a negligible adhesion and/or friction surface. In various embodiments, a lubricant (e.g., an oil) may be applied to temporary insert ply 108 to further reduce friction between temporary insert ply 108 and adjacent full-length plies 104. After fabrication of the composite component is completed, temporary insert ply 108 is removed from edge area 102 resulting in the split in edge area 102.

FIG. 1B illustrates a cross-sectional view of a split, or groove, being fabricated in edge area 122 (e.g., in the negative y-direction) of composite component 120. Composite component 120 includes similar materials to those for composite component 100 described in FIG. 1A including edge area 122, a plurality of full-length plies 124, and a temporary insert ply 128, descriptions of which may not be repeated. Edge area 120 does not include a short ply. Instead, temporary insert ply 128 is placed between the plurality of full-length plies 124 which laterally (e.g., in the positive and negative x-directions) displaces the plurality of full-length plies 124. This displacement results in a minor crease 130, or thickness variation, of the plurality of full-length plies 124. After fabrication is completed, temporary insert ply 128 is removed from edge area 122 resulting in the split in edge area 122.

FIG. 1C illustrates a cross-sectional view of a split, or groove, being fabricated in edge area 152 (e.g., in the negative y-direction) of composite component 150 with a sandwich design. Composite component 150 includes similar materials to composite component 100 described in FIG. 1A including edge area 152, a plurality of plies 154, a short ply 156, and a temporary insert ply 158, descriptions of which may not be repeated below. Composite component further includes a sandwich core 160 and sandwich skin plies 162. In various embodiments, sandwich core 160 may be a foam core. In various embodiments, sandwich core 160 may be a honeycomb core. In various embodiments, sandwich core 160 may be replaced by a laminated composite structure including a plurality of full-length plies (e.g., full-length plies 104). Sandwich skin plies 162 provides an outer structural interface (e.g., in the positive and negative x-directions) between sandwich core 160 and the plurality of plies 154 and short ply 156. Temporary insert ply 158 is disposed between the plurality of plies 154 and is removed after fabrication of the composite component 150. In various embodiments, composite component 150 may not include short ply 156.

Figures 2A, 2B, 2C:
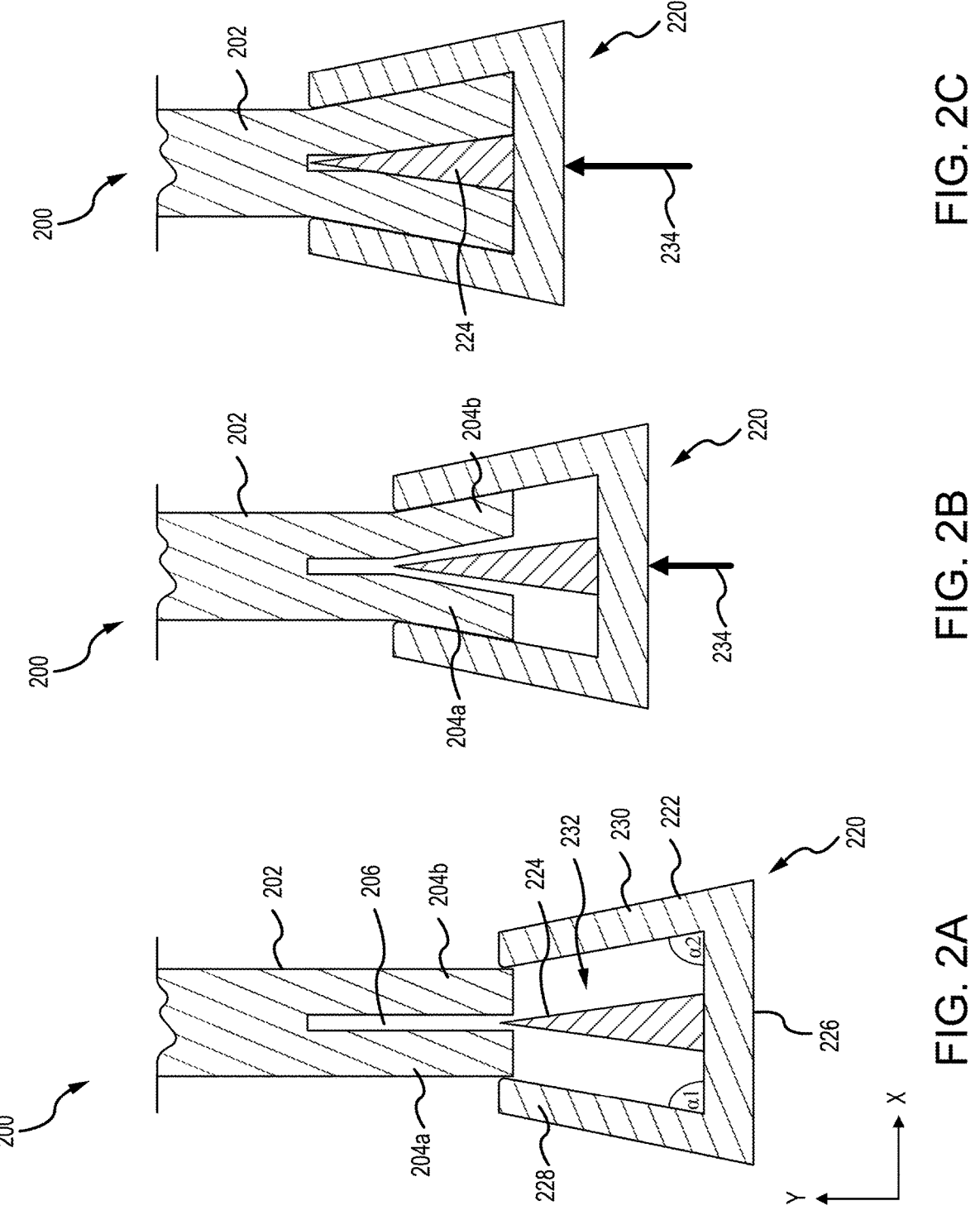
FIGS. 2A, 2B, and 2C illustrate cross-sectional views of the process of installation of a joint onto the edge area of the composite component with a split, shown at different stages of the installation, i.e., before, during and after the installation, respectively, in accordance with various embodiments.

Referring now to FIGS. 2A-2C, cross-sectional views of the installation process of a joint 220 onto a composite component 200 are illustrated, in accordance with various embodiments. FIG. 2A illustrates an initial position of joint 220 with respect to composite component 200 prior to installation. FIG. 2B illustrates an intermediate position of joint 220 with respect to composite component 200 during to installation under an applied load 234. FIG. 2C illustrates a final, self-locking, position of joint 220 with respect to composite component 200 after installation upon application of applied load 234. Composite component 200 includes an edge area 202, a first portion 204a, a second portion 204b, and a split 206. Split 206 is formed in edge area 202 between first portion 204a and second portion 204b. In various embodiments, split 206 may be formed during fabrication of composite component 200 such as those described above in FIGS. 1A-1C. In various embodiments, split 206 may be formed after fabrication of composite component 200. In various embodiments, composite component 200 including edge area 202 may be a monolithic composite laminated material (e.g., composite component 100, 120), after the plies have bonded. In various embodiments, composite component 200 including edge area 202 may be a sandwich composite material (e.g., composite component 150).

Joint 220 includes a component 222 and a triangular insert 224. Component 222 includes a base 226, a first side 228, a second side 230, which define an open-end U-shaped partial trapezoidal cavity 232. That is, component 222 is open ended having three sides instead of four, defining U-shaped partial trapezoidal cavity 232. Base 226 extends in a first direction (e.g., in the positive x-direction). First side 228 extends away from base 226 in a second direction (e.g., in the positive y-direction) and toward second side 230 in the first direction (e.g., in the positive x-direction). Accordingly, first side 228 extends from base 226 at a first angle $\alpha 1$. First angle $\alpha 1$ is less than 90°. In various embodiments, first angle $\alpha 1$ may be about 60° to about 85°. In various embodiments, first angle $\alpha 1$ may be about 75° to about 80°. Second side 230 extends away from base 226 in the second direction and toward first side 228 in a third direction opposite the first direction (e.g., in the negative x-direction). Accordingly, second side 230 extends from base 226 at a second angle $\alpha 2$. Second angle is less than 90°. In various embodiments, second angle $\alpha 2$ may be about 60° to about 85°. In various embodiments, second angle $\alpha 2$ may be about 75° to about 80°. In various embodiments, first angle $\alpha 1$ is equal to second angle $\alpha 2$. Base 226, first side 228, and second side 230 define open-end U-shaped partial trapezoidal cavity 232 of component 222. In various embodiments, component 222 may be formed from a metal or metallic alloy.

Triangular insert 224 is attached to base 226 in U-shaped partial trapezoidal cavity 232 and extends away from base 226 in the second direction toward the open-end of U-shaped partial trapezoidal cavity 232. In various embodiments, triangular insert 224 may extend above a top surface of component 222. In various embodiments, triangular insert 224 may be formed of a metal or a metallic alloy. In various embodiments, triangular insert 224 may be formed of a hard polymeric or a polymeric fiber-reinforced composite material. In various embodiments, triangular insert 224 may be formed from wood, ceramic, or other materials with relatively high stiffness. In various embodiments, triangular insert 224 may be integral with component 222. In various embodiments, triangular insert 224 is a separate component from component 222 that is bonded, or joined, to component 222 within U-shaped partial trapezoidal cavity 232. In various embodiments, triangular insert 224 may be weakly bonded to component 222. In various embodiments, triangular insert 224 may be completely unconnected (e.g., unbonded and unjointed) to the component 222 providing opportunities for geometrical self-positioning during installation under applied load 234.

Referring to FIG. 2A, joint 220 is positioned adjacent composite component 200, and more specifically, adjacent to edge area 202 with triangular insert 224 adjacent to and inline with split 206. First portion 204a is disposed between triangular insert 224 and first side 228 and second portion 204b is disposed between triangular insert 224 and second side 230. In this position, joint 220 is prepared for installation onto composite component 200.

Installation of joint 220 begins by applying load 234 to joint 220 in the direction of composite component 200 (e.g., in the positive y-direction). In various embodiments, the load may be a dynamic impact load that once or repeatedly applies a large force over a short period of time (e.g., by a hammer or other impact generating tool). In various embodiments, the load may be a static load that continuously applies a force or displacement (e.g., a jack, a press, etc.) with a low-rate increase. After application of load 234, joint 220 is seated onto composite component 200, as illustrated in FIG. 2B. Continued application of load 234 results in joint 220 being fully installed on composite component 200, as illustrated in FIG. 2C. In various embodiments, a lubricant may be applied to contacting surfaces of triangular insert 224, first side 228, second side 230, edge area 202, or a combination thereof to aid with installation of joint 220. In various embodiments (e.g., in case of thermoplastic composites), some heat may be applied to joint 220 during installation so that first portion 204a and second portion 204b have temporary stiffness reduction to optimize process of installation.

Once installed, joint 220 forms a strong connection with composite component 200 that resists tension and bending of composite component 200. Joint 220, as illustrated in FIG. 2C, is self-locking in the axial direction (e.g., in the y-axis) due to modified shape of originally straight first portion 204a and second portion 204b and internal compression generated by the wedge effect of triangular insert 224 thus preventing composite component 200 from being removed from joint 220.

In various embodiments, installation of composite component 200 may be reinforced by adhesion at corresponding contact surfaces. In various embodiments, the contact surfaces may comprise surfaces between first portion 204a and first side 228 and surfaces between second portion 204b and second side 230. In various embodiments, the contact surfaces may comprise surfaces between triangular insert 224 and internal surfaces of first portion 204a and second portion 204b. In various embodiments, the contact surfaces may comprise internal surfaces (with respect to U-shaped partial trapezoidal cavity 232) of base 226 and internal edge surfaces of first portion 204a and second portion 204b. The adhesion may provide additional locking effect in addition to the above-noted wedge effect and geometrical restrictions on axial movement (e.g., in the y-direction) due to modified shapes of first portion 204a and second portion 204b. In various embodiments, the adhesion may also play a temporary role of a lubricated media during the installation.

In various embodiments, depending on types of applied composite materials, adhesive at internal contact surfaces may include an epoxy, a polyurethane adhesive, or a polyimide adhesive, among others. In various embodiments, this adhesive may be applied as a paste, a liquid, or a film. In various embodiments, the adhesive may be a hot melt adhesive, a reactive hot melt adhesive, a thermosetting adhesive, a pressure sensitive adhesive, or a contact adhesive, among others.

Figures 3A, 3B:
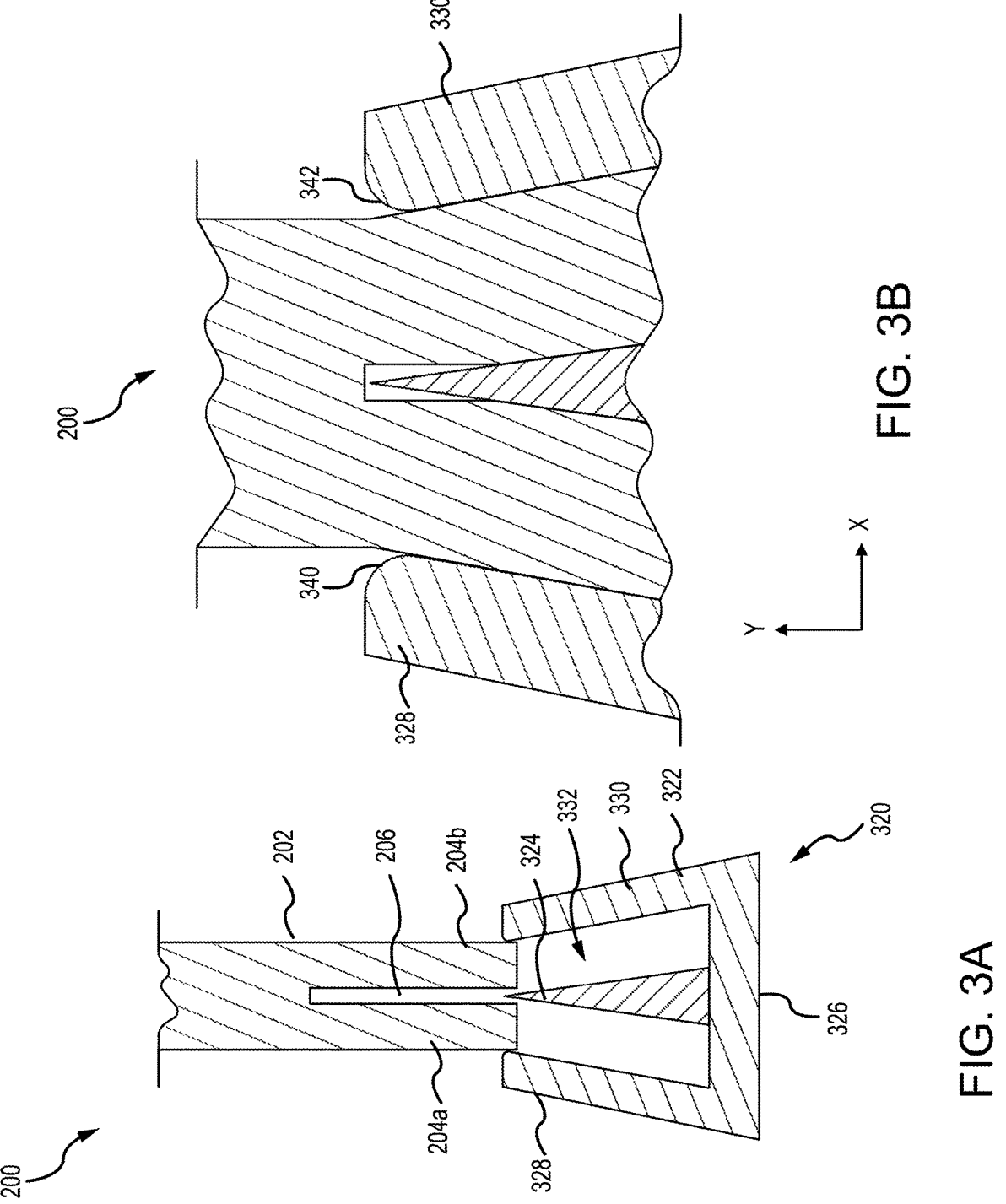
FIGS. 3A and 3B illustrate cross-sectional views of the joint for use with a composite component at the final stage of the installation, in accordance with various embodiments.

Referring now to FIGS. 3A and 3B, a cross-sectional view of the installation of a joint 320 onto a composite component 200 is illustrated, in accordance with various embodiments. FIG. 3A illustrates an initial position of joint 320 with respect to composite component 200 prior to installation. FIG. 3B illustrates a final, self-locking, position of joint 320 with respect to composite component 200 after installation. Joint 320 includes similar components to joint 220 described above in FIGS. 2A-2C including component 322 with U-shaped partial trapezoidal cavity 332 and a triangular insert 324, a base 326, a first side 328, a second side 330, and an open-end U-shaped partial trapezoidal cavity 332, descriptions of which may not be repeated below. Joint 320 further includes first side 328 including a first rounded corner 340 and second side 330 including a second rounded corner 342.

First rounded corner 340 is formed on an interior edge (e.g., in the positive x-direction and the positive y-direction) of first side 328. That is, the upper edge of first side 328 that is adjacent open-end U-shaped partial trapezoidal cavity 332 when joint 320 is not installed and adjacent first portion 204a when joint 320 is installed. This removes sharp corners from first side 328 that are adjacent first portion 204a which, in various embodiments, reduces the risk of potential damage to composite component 200 during installation of joint 320. In various embodiments, first rounded corner 340 may mitigate local contact stresses between joint 320 and composite component 200 after installation.

Second rounded corner 342 is formed on an interior edge (e.g., in the negative x-direction and the positive y-direction) of second side 330. That is, the upper edge of second side 330 that is adjacent open-end U-shaped partial trapezoidal cavity 332 when joint 320 is not installed and adjacent second portion 204*b* when joint 320 is installed. This removes sharp corners from second side 330 that are adjacent second portion 204*b* which, in various embodiments, reduces the risk of potential damage to composite component 200 during installation of joint 320. In various embodiments, second rounded corner 342 may mitigate local contact stresses between joint 320 and composite component 200 after installation.

First side 328 has a first thickness and second side 330 has a second thickness. In various embodiments, the first thickness may be about equal to the second thickness. In various embodiments, the first thickness may be greater than the second thickness. In various embodiments, the first thickness may be less than the second thickness. First rounded corner 340 has a first radius of curvature and second rounded corner 342 has a second radius of curvature.

In various embodiments, the first radius of curvature may be about 10% to about 90% of the first thickness, and more specifically, about 30% to about 70% of the first thickness. In various embodiments, first rounded corner 340 may have a uniform radius of curvature. In various embodiments, first rounded corner 340 may have a non-uniform radius of curvature.

In various embodiments, the second radius of curvature may be about 10% to about 90% of the second thickness, and more specifically, about 30% to about 70% of the second thickness. In various embodiments, second rounded corner 342 may have a uniform radius of curvature. In various embodiments, second rounded corner 342 may have a non-uniform radius of curvature. In various embodiments, the first radius of curvature may be about equal to the second radius of curvature. In various embodiments, the first radius of curvature may be greater than the second radius of curvature. In various embodiments, the first radius of curvature may be less than the second radius of curvature.

Figure 4B:
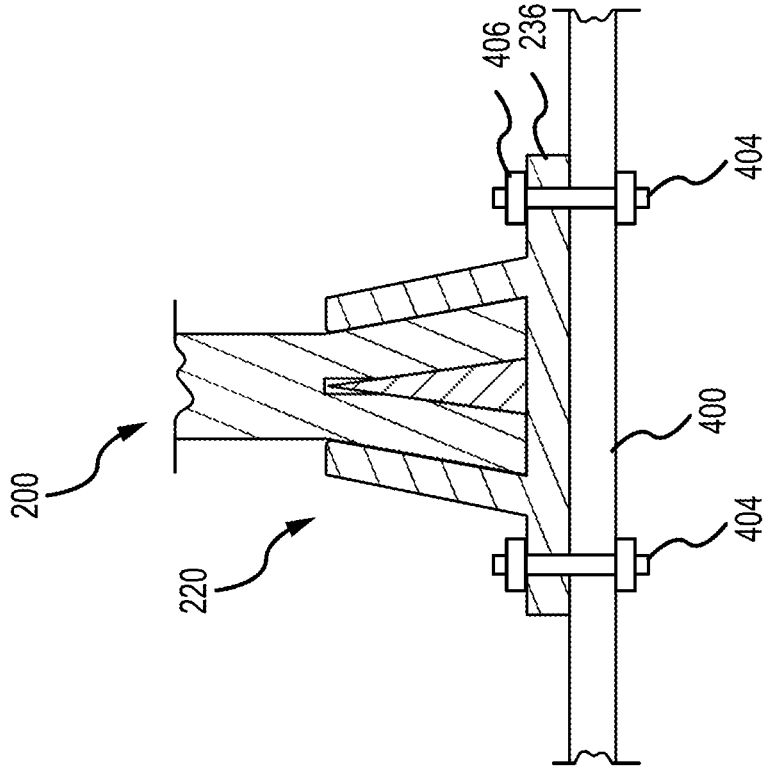
FIGS. 4A and 4B illustrate cross-sectional views of T-type connections of a joint and a panel, in accordance with various embodiments.
Figure 4A:
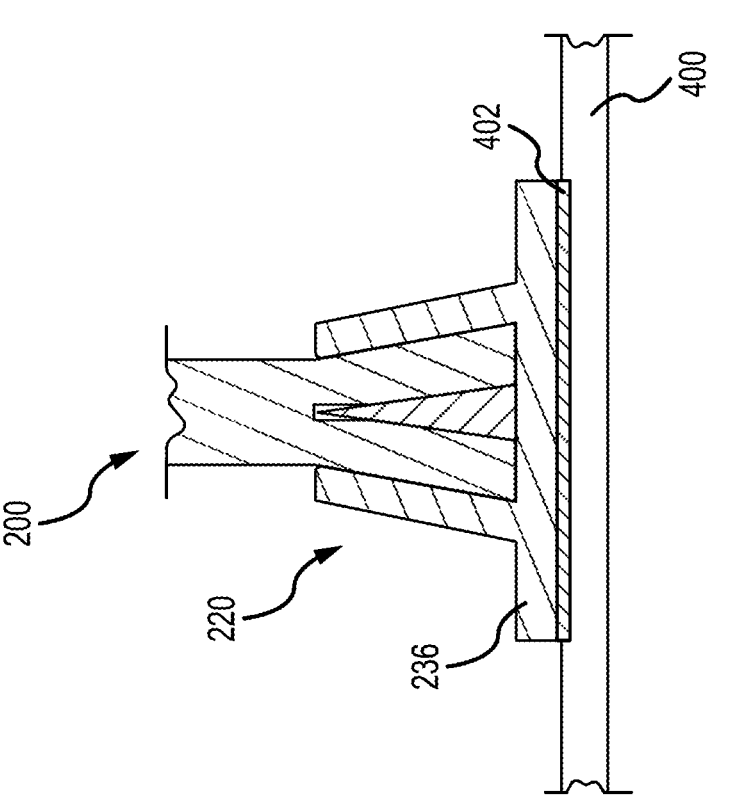

Referring now to FIGS. 4A and 4B, cross-sectional views of T-type connections of joint 220 and a panel 400 are illustrated, in accordance with various embodiments. As illustrated, joint 220 is installed on composite component 200 and coupled to panel 400. The T-type connections may allow, in various embodiments, the use of joint 220 and panel 400 in manufacturing furniture or other fixtures. Various different connections may be used to couple joint 220 to panel 400. FIG. 4A illustrates a cross-sectional view of the connection of joint 220 to panel 400 using an adhesive 402. In various embodiments, adhesive 402 may be applied to panel 400, joint 220, or a combination thereof. In various embodiments, depending on types of applied composite materials, adhesive 402 may include an epoxy, a polyurethane adhesive, or a polyimide adhesive, among others. In various embodiments, adhesive 402 may be applied as a paste, a liquid, or a film. In various embodiments, adhesive 402 may be a hot melt adhesive, a reactive hot melt adhesive, a thermosetting adhesive, a pressure sensitive adhesive, or a contact adhesive, among others.

FIG. 4B illustrates a cross section of the connection of joint 220 to panel 400 using fasteners 404. Each fastener 404 passes through a flange 236 on each side of component 222. In various embodiments, one or more nuts 406 may be placed between fastener 404 and flange 236 and/or between fastener 404 and panel 400. In various embodiments, fastener 404 may be a bolt, a rivet, or a screw, among other fasteners. In various embodiments, fastener 404 may be tightened to draw joint 220 and panel 400 together.

Figure 5A:
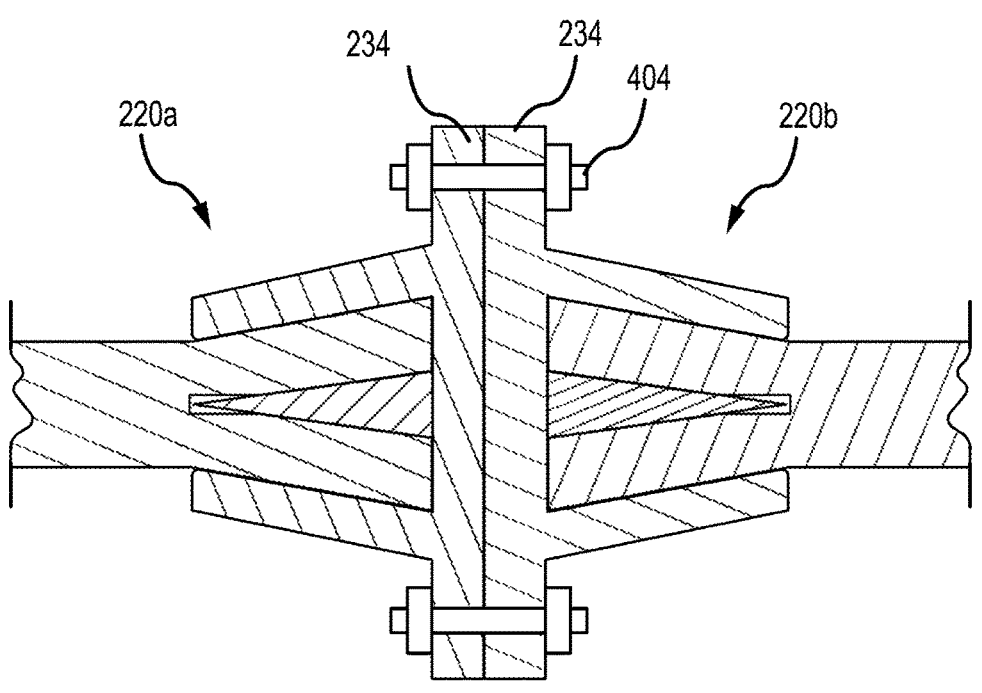
FIGS. 5A and 5B illustrate cross-sectional views of longitudinal connections of a first joint and a second joint, in accordance with various embodiments.
Figure 5B:
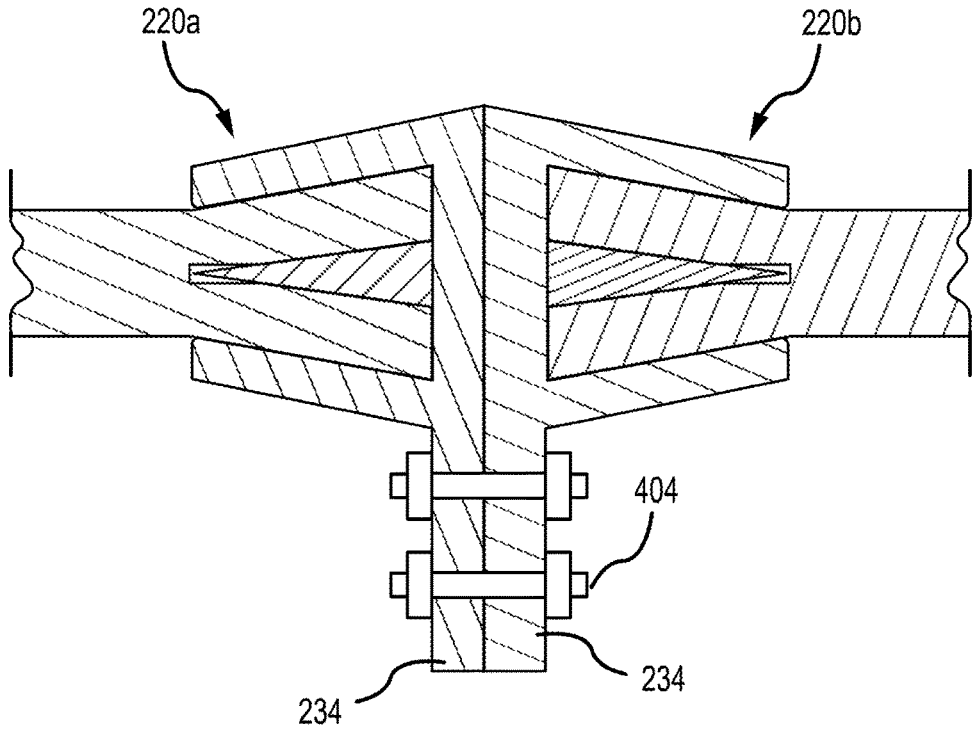

Referring now to FIGS. 5A and 5B, cross-sectional views of longitudinal connections of a first joint 220*a* and a second joint 220*b* are illustrated, in accordance with various embodiments. A longitudinal connection may be used to extend the length of a composite component 200. Various different longitudinal connections may be used to couple first joint 220*a* to second joint 220*b*. FIG. 5A illustrates a cross section of a longitudinal connection in which both sides of first joint 220*a* and second joint 220*b* include flange 236. FIG. 5B illustrates a cross section of a longitudinal connection in which a single side first joint 220*a* and second joint 220*b* include an extended flange 236. First joint 220*a* and second joint 220*b* may be coupled together using one or more fasteners 404. As described above, fasteners 404 may include a bolt, a rivet, or a screw, among other fasteners. In various embodiments, fastener 404 may be tightened to first joint 220*a* and second joint 220*b* together. In various embodiments, an adhesive, such as adhesive 402 described above in FIGS. 4A and 4B, may be applied to first joint 220*a*, second joint 220*b*, or both prior to tightening fasteners 404.

Figures 6A, 6B, 6C:
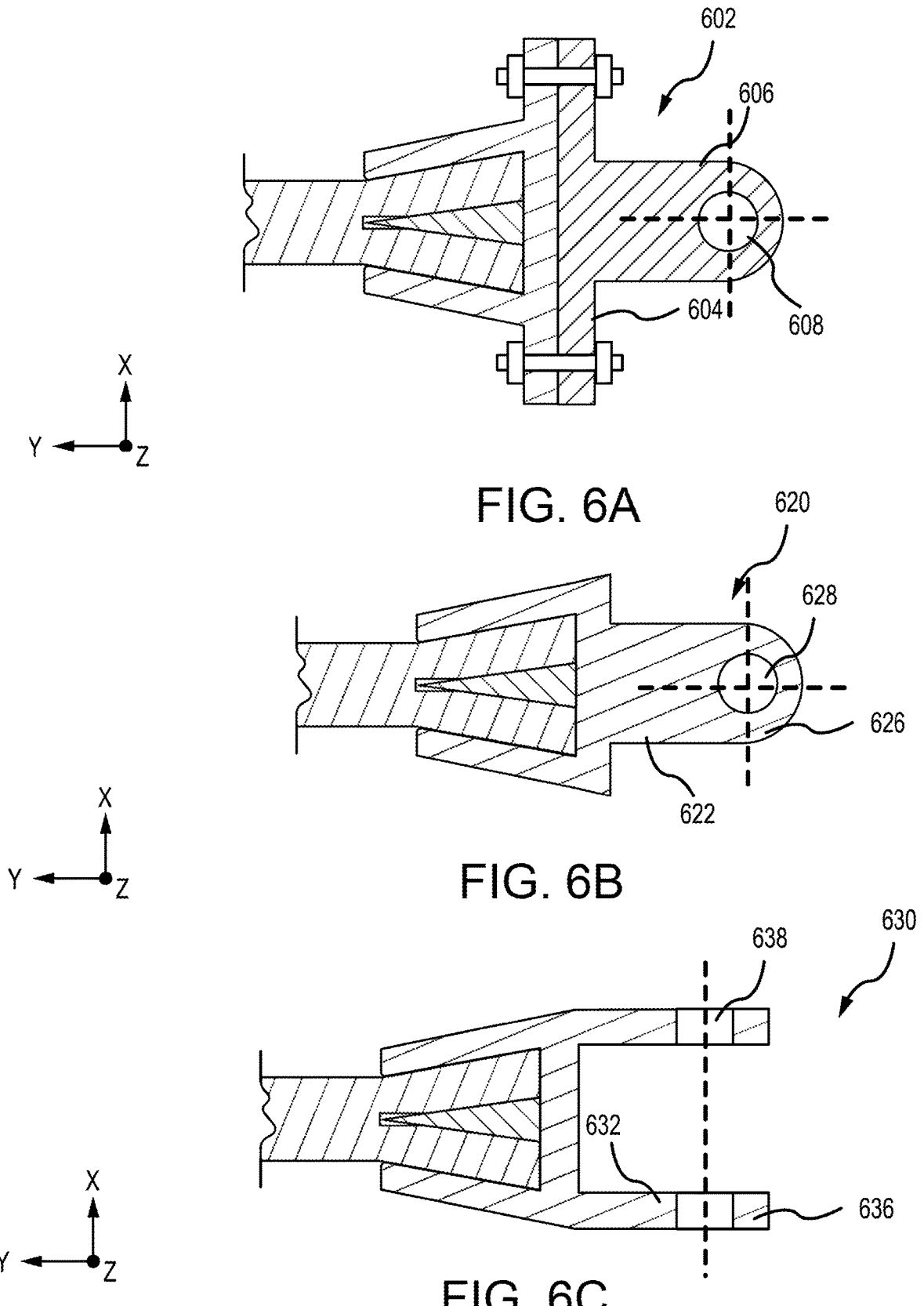
FIGS. 6A, 6B, and 6C illustrate cross-sectional views of load transferring devices, e.g., a lug, for use with a joint coupled to a composite component, in accordance with various embodiments.

Referring now to FIGS. 6A-6C, cross-sectional views of load transfer mechanisms for use with joint 220 are illustrated, in accordance with various embodiments. FIG. 6A illustrates a cross-sectional view of joint 220 and a lug 602. FIG. 6B illustrates a cross-sectional view of a joint 620 including an embedded lug. FIG. 6C illustrates a cross-sectional view of a joint 630 including another variant of embedded lug. These representative designs with lugs may, in various embodiments, improve load transfer from composite component 200, for example, in the longitudinal direction (e.g., in the y-direction). Referring first to FIG. 6A, joint 220 may be coupled to lug 602 as previously described by using an adhesive, one or more fasteners, or a combination the two. As illustrated in FIG. 6A, the lug includes a base 604 and portion 606 that extends orthogonally from base 604 (e.g., in the negative y-direction). Portion 606 may include a hole 608, or aperture, formed therethrough (e.g., along the z-axis). In various embodiments, portion 606 may include two parallel portions extending orthogonally from either side of base 604, each portion 606 including a hole 608, or aperture. In various embodiments, hole 608 may be used to couple joint 220 and lug 602 to another component. In various embodiments, a bolt, screw, or rivet may be used to couple lug 602 to the other component.

Referring now to FIG. 6B, joint 620 includes an integrated, or monolithic, lug 622 including one or more portions 626 that extend orthogonally from base 226 of joint 620. Each portion 626 may include a hole 628, or aperture, extending therethrough (e.g., along the z-axis). Joint 620 may be used in a similar manner to lug 602 described above. As illustrated in FIG. 6B, integrated lug 622 is wider in a first direction (e.g., along the x-axis) than in a second direction (e.g., along the z-axis). Hole 628 is formed through the wider portion of lug 622.

Referring now to FIG. 6C, joint 630 includes an integrated, or monolithic, lug 632 including one or more portions 636 that extend orthogonally from base 226 of joint 630. Each portion 636 may include a hole 638, or aperture, extending therethrough (e.g., along the x-axis). Joint 620 may be used in a similar manner to lug 602 described above. As illustrated in FIG. 6C, integrated lug 632 is wider in the second direction (along the z-axis) than in the first direction (e.g., along the x-axis). Hole 638 is formed through the wider portion of lug 632.

Figures 7A, 7B:
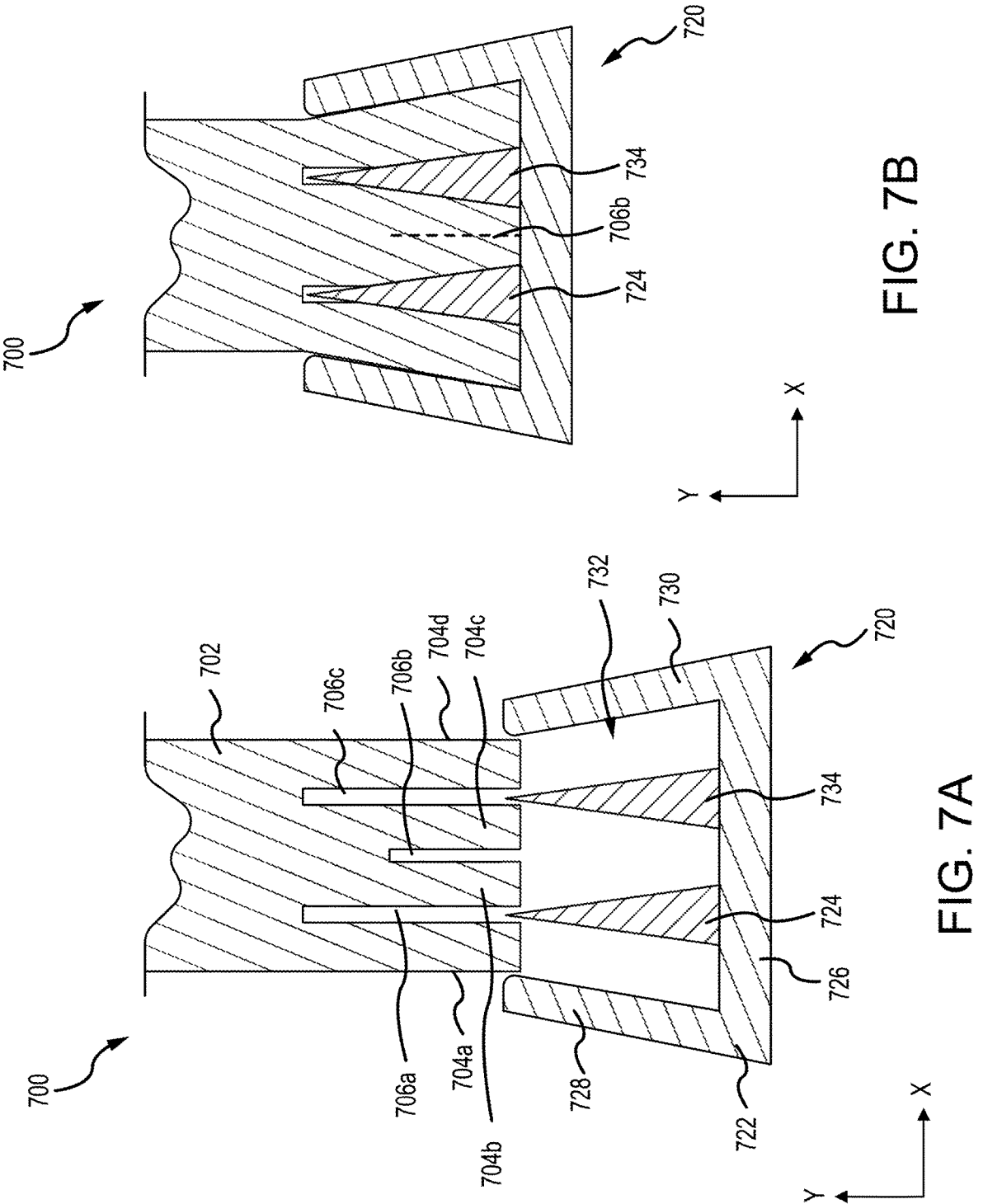
FIGS. 7A and 7B illustrate cross-sectional views of the joint for use with a composite component before and after installation, respectively, in accordance with various embodiments.

Referring now to FIGS. 7A and 7B, a cross-sectional view of the installation process of a joint 720 onto a composite component 700 is illustrated, in accordance with various embodiments. FIGS. 7A and 7B, including component 700 and joint 720, illustrate a possible variation of composite component 200 and joint 220, though other variations are possible. FIG. 7A illustrates an initial position of joint 720 with respect to composite component 200 prior to installation. FIG. 7B illustrates a final, self-locking, position of joint 720 with respect to composite component 200 after installation. Composite component 700 includes similar components to composite component 200 described above in FIGS. 2A-2C including an edge area 702, a first portion 704*a*, a second portion 704*b*, and a first split 706*a*, descriptions of which may not be repeated below. Joint 720 includes similar components to joint 220 described above in FIGS. 2A-2C including a component 722 with U-shaped partial trapezoidal cavity, a first triangular insert 724, a base 726, a first side 728, a second side 730, and an open-end U-shaped partial trapezoidal cavity 732, descriptions of which may not be repeated below.

Composite component 700 further includes a third portion 704*c*, a fourth portion 704*d*, a second split 706*b*, and a third split 706*c*. Second split 706*b* and third split 706*c* may be formed in a similar manner to first split 706*a*, as described above in FIGS. 1A-1C. In the illustrated embodiment, first split 706*a* is disposed between first portion 704*a* and second portion 704*b*, second split 706*b* is disposed between second portion 704*b* and third portion 704*c*, and third split 706*c* is disposed between third portion 704*c* and further portion 704*d*. In various embodiments, each of first split 706*a*, second split 706*b*, and third split 706*c* may have the same height and as each of the others. In various embodiments, second split 706*b* may be shorter than first split 706*a* and third split 706*c*, longer than first split 706*a* and third split 706*c*, wider than first split 706*a* and third split 706*c*, narrower than first split 706*a* and third split 706*c*, or some combination thereof.

Joint 720 further includes a second triangular insert 734 that is attached to base 726 inside U-shaped partial trapezoidal cavity 732 and adjacent first triangular insert 724. In various embodiments, first triangular insert 724 and second triangular insert 734 may be spaced equidistance from each other and first side 728 and second side 730. In various embodiments, the spacing between first side 728, first triangular insert 724, second triangular insert 734, and second side 730 may be non-uniform.

During installation of joint 720 onto composite component 700, first triangular insert 724 is aligned with first split 706*a* and second triangular insert is aligned with third split 706*c*. Installation of joint 720 is the same as installation of joint 220 described above in FIGS. 2A-2C. After joint 720 is installed under applied longitudinal load (e.g., in the positive y-direction), second split 706*b* may be closed by second portion 704*b* and third portion 704*c* being pushed together by first triangular insert 724 and second triangular insert 734. That is, second split 706*b* is formed and position in order to compensate for deformation of edge area 202, and more specifically by second portion 704*b* and third portion 704*c* during installation. The longitudinal load applied for installation is characterized by the same embodiments, described in FIGS. 2A-2C.

It should be appreciated that other variations composite component 700 and joint 720 are contemplated by the present description. In various embodiments, second split 706*b* may be excluded from composite component 700. In various embodiments, joint 720 may include more than two triangular inserts that correspond to a similar number of slits in composite component 700.

Figure 8A:
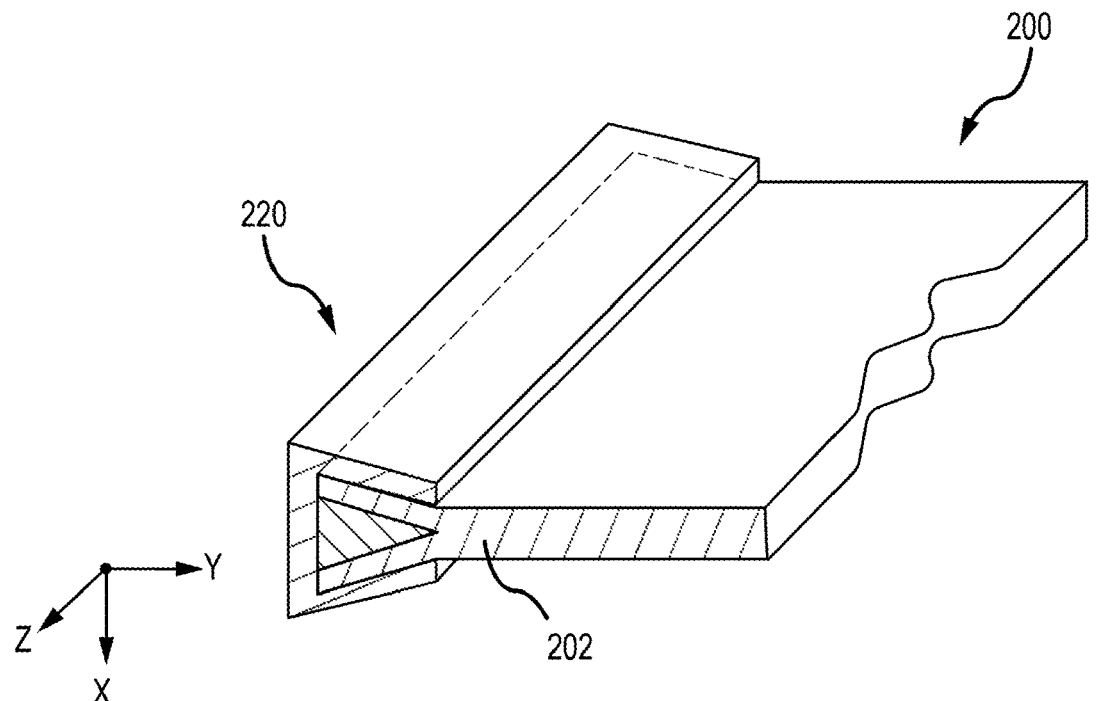
FIGS. 8A and 8B illustrate perspective views of joint systems with a single long joint and multiple shorter joints, respectively.
Figure 8B:
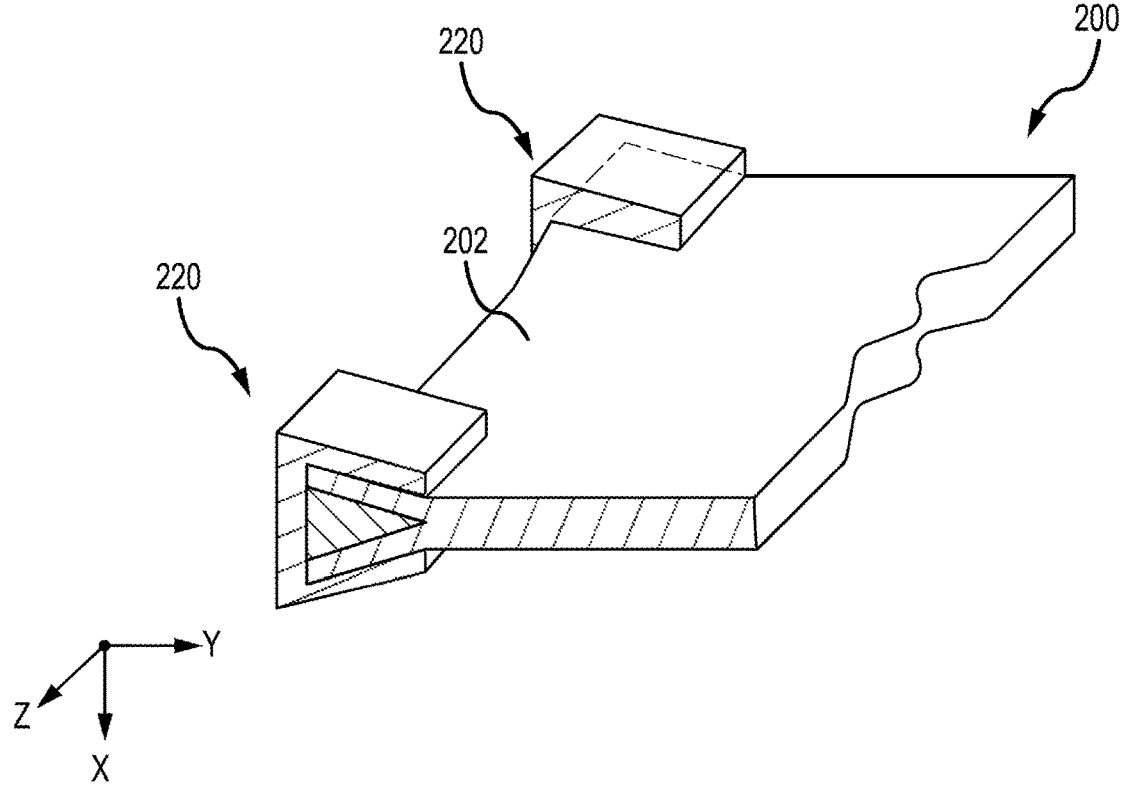

Referring now to FIGS. 8A and 8B, variants of joint 220 installed on composite component 200 are illustrated, in accordance with various embodiments. FIG. 8A illustrates joint 220 as a single continuous, long joint 220 that is installed along the entire or part of edge area 202 of composite component 200. FIG. 8B illustrates multiple, shorter joints 220 that are installed at discrete locations along edge area 202 of composite component 200. Various other lengths of joint 220 and/or installation locations of joint 220 are contemplated herein.

Figure 9:
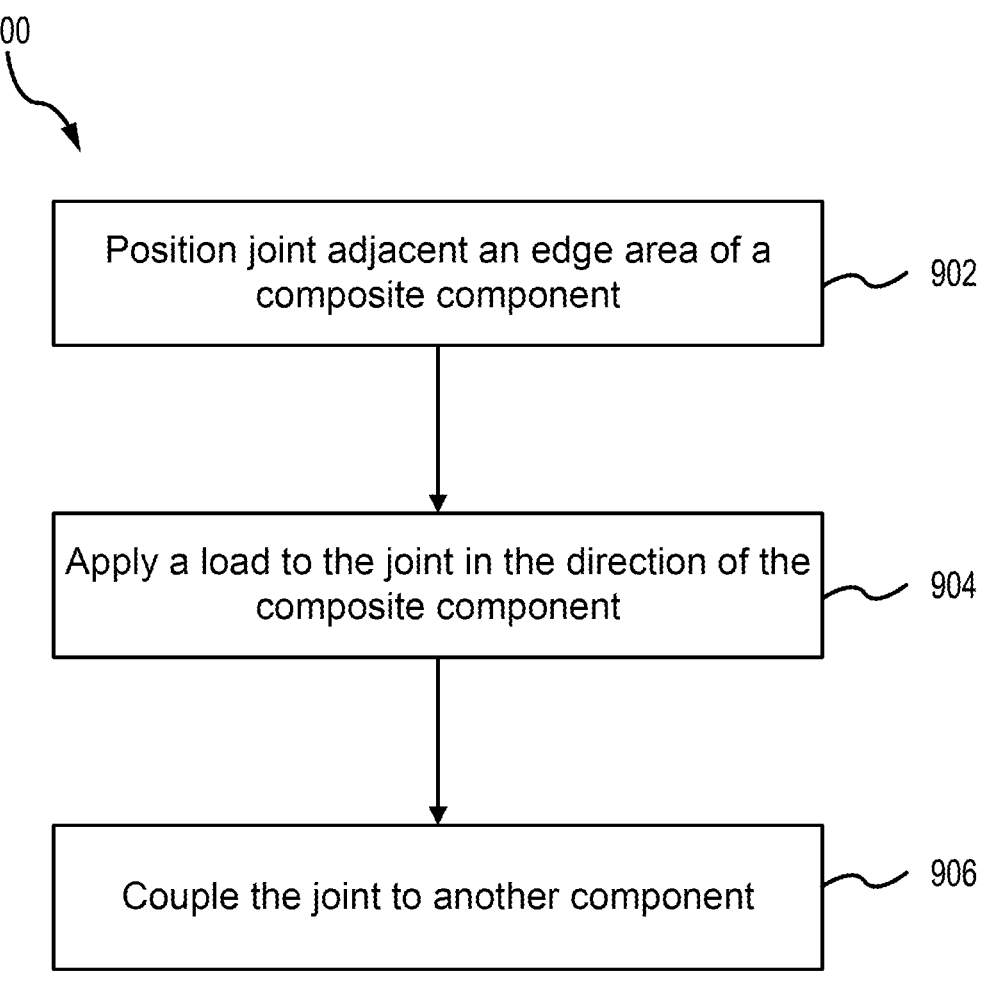
FIG. 9 illustrates a flow diagram of a method installing a joint onto a composite laminated component, in accordance with various embodiments.

Referring now to FIG. 9, a method 900 of installing a joint onto a composite component is illustrated, in accordance with various embodiments. At block 902, a joint (e.g., joint 220) is positioned adjacent to an edge area of a composite component (e.g., composite component 200 and edge are 202). In placing the joint, the triangular insert of the joint is aligned with the split in the edge area of the composite component. At block 904, a load is applied to the joint in the direction of the composite component. In various embodiments, the load may be a dynamic impact load including single or repeated applications of a force over a short period of time (e.g., a hammer blow). In various embodiments, the load may be a static load including a single application of a force or a displacement, over a long period of time (e.g., by a press). At block 906, the joint is coupled to another component. As disclosed herein, the other component may be a lug, a panel, another joint. In various embodiments, the other component may be of different materials and/or geometrical designs.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system of interlocked components, comprising:
a composite component including a first portion, a second portion, and a finite-length edge split between the first portion and the second portion; and
a joint including:
a component including a partial U-shaped trapezoidal cavity, including:
a base extending in a first direction;

a first side extending away from the base at a first angle from the first direction;
a second side extending away from the base at a second angle from the first direction and toward the first side; and
an opening defined by the first side and the second side and configured to receive the composite component; and
a triangular component integral with the base and extending orthogonally away from the base in a second direction toward the opening, the triangular component configured to insert into the split.

2. The system of claim 1, wherein a first internal surface of the first side is disposed adjacent to and physically contacting an external surface of the first portion and a second internal surface of the second side is disposed adjacent to and physically contacting an external surface of the second portion.

3. The system of claim 1,
wherein the first side includes:
a first top surface facing away from the base; and
a first internal side surface facing toward the second side, the first internal side surface forming a first corner with the first top surface, wherein the first corner is rounded; and
wherein the second side includes:
a second top surface facing away from the base; and
a second internal side surface facing toward the first side, the second internal side surface forming a second corner with the second top surface, wherein the second corner is rounded.

4. The system of claim 1, further comprising:
a panel including a third surface that is coupled to the base.

5. The system of claim 4, wherein the panel is coupled to the base using an adhesive.

6. The system of claim 4, wherein the base further includes a flange extending from the base in the first direction, the flange being coupled to the panel by a fastener.

7. The system of claim 1, wherein the composite component further comprises:
a first plurality of full-length plies forming the first portion;
a second plurality of full-length plies forming the second portion; and
a shorter ply disposed between the first plurality of full-length plies and the second plurality of full-length plies and forming the finite-length edge split.

8. The system of claim 1, wherein the composite component further includes a third portion and a second split disposed between the second portion and the third portion, wherein the joint further includes a second triangular component coupled to the base and extending orthogonally away from the base in the second direction and toward the opening, the second triangular component configured to insert into the second split.

* * * * *